(12) United States Patent
Jeon

(10) Patent No.: US 7,541,110 B2
(45) Date of Patent: Jun. 2, 2009

(54) SECONDARY BATTERY

(75) Inventor: Byeong Deok Jeon, Youngin-si (KR)

(73) Assignee: Samsung SDI Co., Ltd., Suwon-si ( * ) Notice: Subject to any disclaimer, the term of this patent is extended or adjusted under 35 U.S.C. 154(b) by 339 days.

(21) Appl. No.: 11/234,822

(22) Filed: Sep. 22, 2005

(65) Prior Publication Data

US 2006/0099500 A1    May 11, 2006

(30) Foreign Application Priority Data

Sep. 22, 2004    (KR)    .................... 10-2004-0076147

(51) Int. Cl.
H01M 2/08    (2006.01)
H01M 2/22    (2006.01)

(52) U.S. Cl. ..................... 429/161; 429/171
(58) Field of Classification Search ............ 429/7, 429/61, 161, 171, 175, 211
See application file for complete search history.

(56) References Cited

U.S. PATENT DOCUMENTS

| | | | | |
|---|---|---|---|---|
| 3,170,325 | A * | 2/1965 | Sinclair | .................... 429/91 X |
| 6,159,630 | A | 12/2000 | Wyser | |
| 6,204,635 | B1 * | 3/2001 | Sullivan | ..................... 320/134 |
| 6,506,513 | B1 * | 1/2003 | Yonetsu et al. | ............ 429/53 X |
| 2002/0142195 | A1 * | 10/2002 | Ehara | ........................ 429/175 |
| 2003/0180582 | A1 * | 9/2003 | Masumoto et al. | ............. 429/7 |
| 2004/0228061 | A1 | 11/2004 | Kim et al. | |

FOREIGN PATENT DOCUMENTS

CN    1519963 A    8/2004
KR    10-2001-0038813    5/2001

OTHER PUBLICATIONS

Korean Patent Abstracts, Publication No. 1020010038813 A, dated May 15, 2001, in the name of Gwang Won Seo.
Chinese Office action dated Dec. 21, 2007, for corresponding China application 2005101069240, indicating relevance of references in this IDS.

* cited by examiner

Primary Examiner—Stephen J. Kalafut
(74) Attorney, Agent, or Firm—Christie, Parker & Hale, LLP

(57) ABSTRACT

A secondary battery including a can for receiving an electrolyte and an electrode assembly including first and second electrode plates and a cap assembly including a cap plate covering an upper portion of the can. An electrode terminal connected to one of the first and second electrode plates is inserted into a center portion of the cap plate. A safety vent is formed at a first side of the cap plate and an electrode lead wire is connected to an upper surface of the electrode terminal to connect the electrode terminal to an external terminal. A washer is installed on an upper surface of the cap assembly in order to insulate the cap plate from the electrode lead wire and has an exposure part for exposing the safety part allowing the location of the safety vent to be noted without disassembly of the secondary battery.

9 Claims, 3 Drawing Sheets

SECONDARY BATTERY

CROSS-REFERENCE TO RELATED APPLICATION

This application claims priority to and the benefit of Korean Patent Application No. 10-2004-0076147 filed on Sep. 22, 2004 in the Korean Intellectual Property Office, the entire content of which is incorporated herein by reference.

BACKGROUND OF THE INVENTION

1. Field of the Invention

The present invention relates to a secondary battery. More particularly, the present invention relates to a secondary battery having improved characteristics for manufacturing the secondary battery.

2. Description of the Prior Art

Recently, electronic appliances having compact sizes with light weight, such as cellular phones, notebook computers and camcorders, have been actively developed and produced. Such electronic appliances are equipped with battery packs so that users can use the electric/electronic appliances in various places even if electric power sources are not separately provided for the electronic appliances. The battery pack includes at least one battery capable of outputting an operational voltage having a predetermined level in order to operate the electronic appliances for a predetermined period of time.

Secondary batteries, which are rechargeable batteries, are currently employed in the secondary pack due to their economical advantages. The secondary batteries include Ni—Cd batteries, Ni-MH batteries and Li secondary batteries, such as Li batteries or Li-ion batteries.

In particular, lithium secondary batteries have an operational voltage of about 3.6V, which is three times higher than that of Ni—Cd batteries or Ni-MH batteries used as power sources for the portable electronic appliances. In addition, the lithium ion secondary batteries have high energy density per unit weight, so the lithium ion secondary batteries are extensively used in the advanced electronic technology fields.

The lithium secondary battery uses lithium-based oxide as a positive electrode active material and carbon as a negative electrode active material. In general, lithium batteries are classified into liquid electrolyte batteries and polymer electrolyte batteries according to the kind of the electrolytes used therefor. The liquid electrolyte batteries are called "lithium ion batteries" and the polymer electrolyte batteries are called "lithium polymer batteries". In addition, lithium secondary batteries may be fabricated with various shapes, such as cylinder type batteries, square type batteries, or pouch type batteries.

Typically, lithium secondary batteries include a can, a jellyroll type electrode assembly accommodated in the can, a cap assembly coupled to an upper portion of the can to seal the can and a washer coupled to an upper portion of a cap plate provided in the cap assembly.

The cap plate has a centrally located terminal hole into which an electrode terminal is inserted, and has an electrolyte injection hole on one side through which an electrolyte is injected into the can. In addition, a safety vent is formed at the other side of the cap plate. The safety vent may be prepared by forming a hole in the cap plate and sealing the hole with a laminated plate by means of welding, or by forming a recess having a predetermined depth such that the side of the cap plate has a significantly reduced thickness. Thus, the safety vent may be fracturable before internal pressure of the battery rises to a dangerous level or when an explosion occurs in the battery.

In addition, an electrode lead wire is installed at an upper portion of the cap plate in order to electrically connect an external terminal with the electrode terminal. A washer is formed at a center portion thereof with an electrode lead hole for allowing the electrode terminal to make contact with the electrode lead wire so that the electrode terminal is exposed through the electrode lead hole of the washer. The washer is installed on an upper portion of the cap plate in order to prevent short-circuit between the cap plate and the electrode lead wire.

However, according to a conventional secondary battery having the above structure, the washer is made from an opaque material with a symmetrical structure. Thus, it is difficult for a worker to locate the position of the electrolyte injection hole and the safety vent during the fabrication process for the secondary battery if the electrolyte injection hole or the safety vent is covered with the washer. That is, the worker must check the position of the safety vent or the electrolyte injection hole by raising the washer when welding the electrode terminal to the electrode wire, reducing the efficiency of welding work.

In addition, since the electrolyte injection hole is sealed by means of a plug, the washer may loosen on the cap plate due to a protrusion part of the plug protruding from an upper surface of the cap plate. That is, the washer may not remain horizontal on the cap plate, making it difficult to securely fix other components to the battery.

SUMMARY OF THE INVENTION

Accordingly, a secondary battery is provided enabling a worker to locate the position of a safety vent during a fabrication process for the secondary battery even if a washer has been installed on a cap plate. The secondary battery provided is also capable of preventing a washer from loosening on a cap plate due to contact between a plug inserted into an electrolyte injection hole and the washer.

A secondary battery is provided including: a can for receiving an electrolyte and an electrode assembly obtained by winding first and second electrode plates and a separator; a cap assembly including a cap plate covering an upper portion of the can, an electrode terminal connected to one of the first and second electrode plates being inserted into a center portion of the cap plate; an electrode lead wire connected to an upper surface of the electrode terminal in order to connect the electrode terminal to an external terminal; and a washer installed on an upper surface of the cap assembly in order to insulate the cap plate from the electrode lead wire and formed with a hole for the electrode terminal to protrude an exposure part for exposing a position of the cap plate.

According to an exemplary embodiment of the present invention, the exposure part includes a safety vent hole positioned corresponding to the safety vent formed in the cap plate and a cover member made from transparent resin is installed in the safety vent hole. The transparent resin includes one selected from the group consisting of polybutylene-terephthalate (PBT), polyethylene, polyethylene terepthalate (PET), polypropylene, Teflon, and poly-tetrafluoro-ethylene.

The cap plate is formed at a second side thereof with an electrolyte injection hole, which is sealed by means of a plug, and the washer is formed with a plug hole for allowing the plug inserted into the electrolyte injection hole to protrude through the plug hole or for exposing a position of the plug. An insulation material is coated on an upper surface of the plug.

At least two support members having a predetermined height are provided at a bottom surface of the cap plate so that the cap plate is spaced from the washer by a predetermined distance corresponding to the predetermined height of the support members. The height of the support member is designed such that an upper portion of the plug does not protrude beyond an upper surface of the washer.

DETAILED DESCRIPTION

Figure 1:
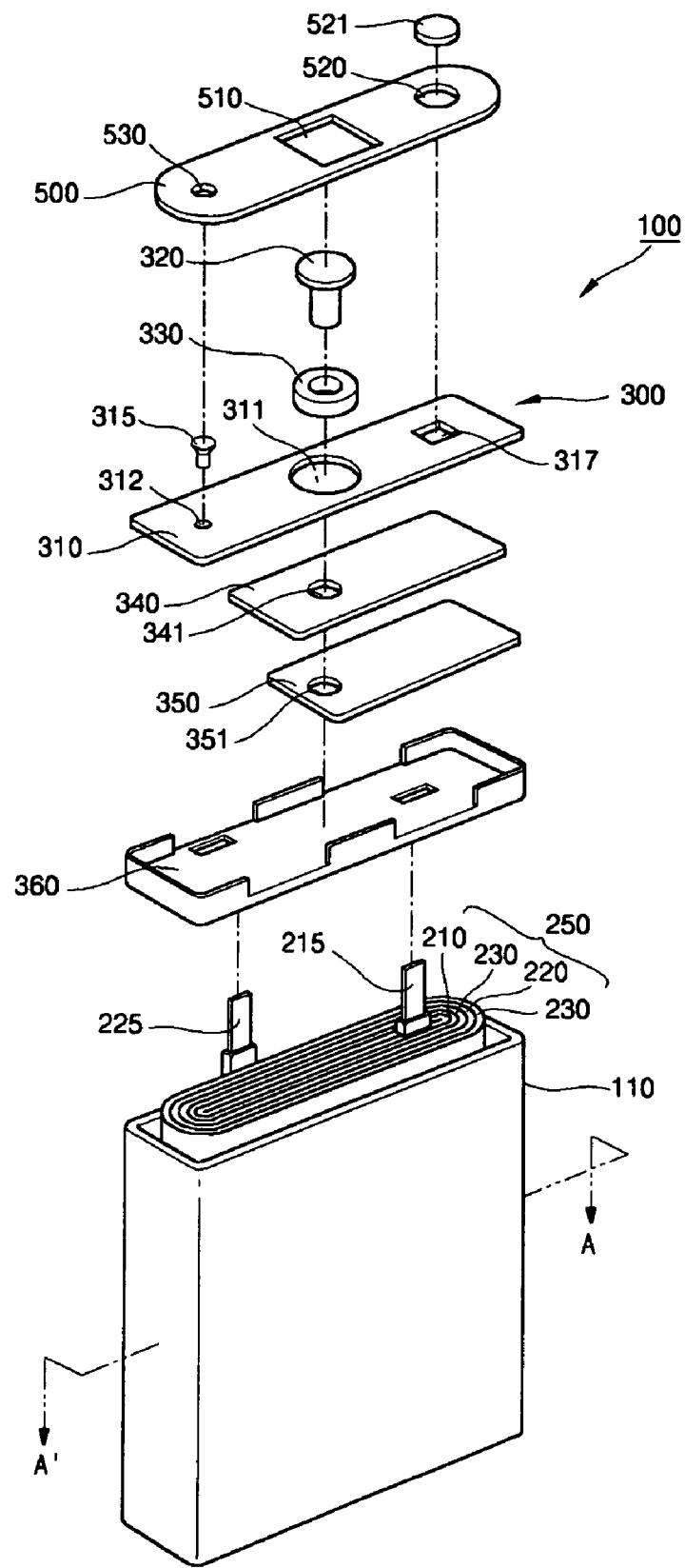
FIG. 1 is an exploded perspective view illustrating a secondary battery according to one embodiment of the present invention.

Referring to FIGS. 1 to 4, a secondary battery 100 includes a can 110 formed at an upper portion thereof with an opening, an electrode assembly 250 accommodated in the can 110, a cap assembly 300 having a cap plate 310 coupled with the opening of the can 110 in order to seal the can 110, and a washer 500 installed on the cap plate 310. The can 110 is made from a metallic member having a substantially hexahedronal shape and serves as a terminal.

The electrode assembly 250 includes a first electrode plate 210 having a first electrode tap 215, a second electrode plate 220 having a second electrode tap 225, and a separator 230 interposed between the first and second electrode plates 210 and 220. The first and second electrode plates and the separator are wound in the form of a jellyroll.

The cap assembly 300 includes the cap plate 310, an insulation plate 340, a terminal plate 350 and an electrode terminal 320.

The cap plate 310 is fabricated by using a metal plate having a size and a shape corresponding to the opening of the can 110. The cap plate 310 has a centrally located first terminal hole 311 into which the electrode terminal 320 is insertable.

The electrode terminal 320 is connected to the first electrode tap 215 or the second electrode tap 225 so that the electrode terminal 320 acts as either a positive electrode terminal or a negative electrode terminal, respectively. In order to insulate the electrode terminal 320 from the cap plate 310 when the electrode terminal 320 is inserted into the first terminal hole 311 of the cap plate 310, a tube type gasket 330 is provided around the electrode terminal 320 and inserted into the first terminal hole 311 of the cap plate 310 together with the electrode terminal 320. In one exemplary embodiment, the electrode terminal 320 is a negative electrode terminal.

A safety vent 317 is provided at one side of the cap plate 310. The safety vent 317 is fracturable when the internal pressure of the battery rises to a dangerous level or when an explosion occurs in the battery. The safety vent 317 may be prepared by forming a hole at one side of the cap plate and sealing the hole with a laminated plate by means of welding, or by forming a recess having a predetermined depth at one side of the cap plate 310 such that one side of the cap plate 310 has a significantly reduced thickness. The cap plate 310 has at the other side thereof an electrolyte injection hole 312 having a predetermined size. When the cap assembly 300 has been coupled with the opening of the can 110, an electrolyte is injected into the can through the electrolyte injection hole 312. After that, the electrolyte injection hole 312 is sealed by means of a plug 315.

The insulation plate 340 is made from an insulation material substantially identical to that of the gasket 330 and is coupled to a lower surface of the cap plate 310. The insulation plate 340 is formed with a second terminal hole 341 positioned corresponding to the first terminal hole 311 of the cap plate 310.

The terminal plate 350 is made from Ni or a Ni alloy and is coupled to a lower surface of the insulation plate 340. The terminal plate 350 has a third terminal hole 351 positioned corresponding to the first terminal hole 311 of the cap plate 310. The electrode terminal 320 is insertable into the third terminal hole 351 of the terminal plate 350. Thus, the electrode terminal 320 is electrically connected to the terminal plate 350 while being electrically insulated from the cap plate 310 by means of the gasket 330.

In addition, an insulation case 360 is installed on the upper surface of the electrode assembly 250 so as to cover an upper end portion of the electrode assembly 250 in such a manner that the electrode assembly 250 may be electrically insulated from the cap assembly 310.

Figure 2:
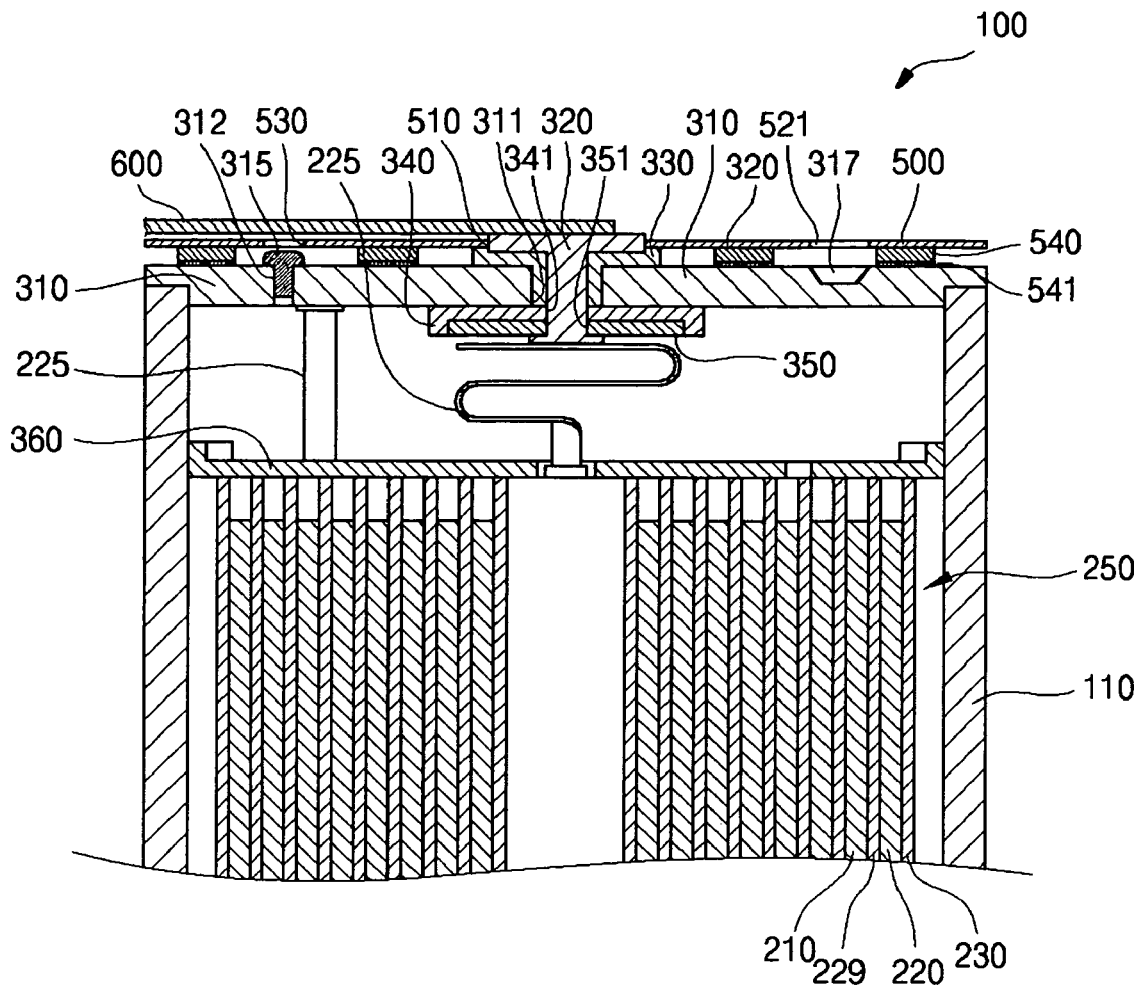
FIG. 2 is a sectional view taken along line A-A' shown in FIG. 1.
Figure 3:
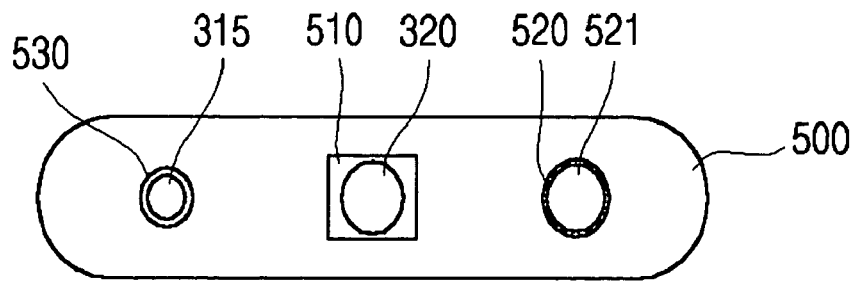
FIG. 3 is a plan view illustrating a can coupled with a washer according to one embodiment of the present invention.
Figure 4:
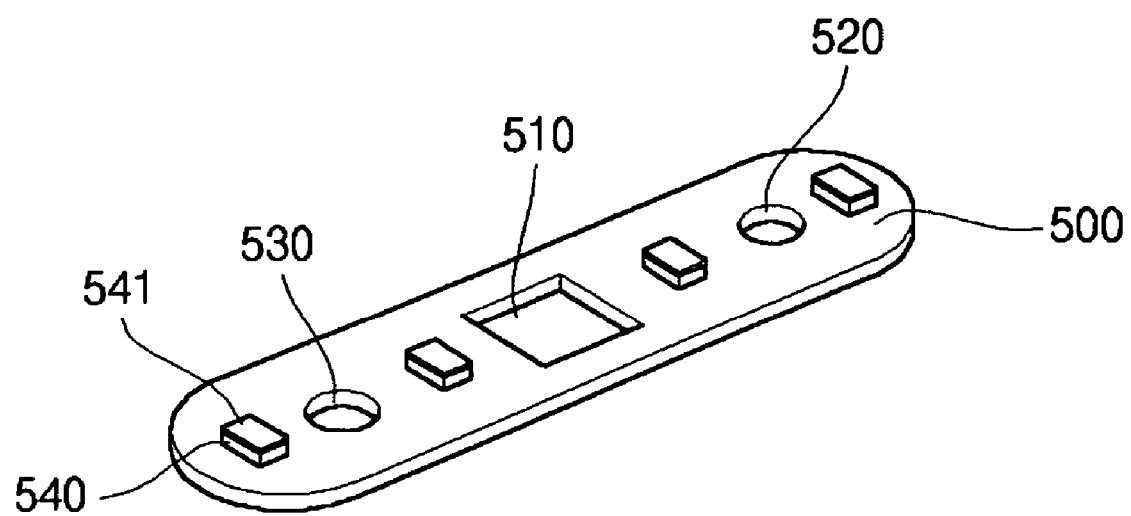
FIG. 4 is a perspective view illustrating a bottom surface of a washer according to one embodiment of the present invention.

As shown in FIG. 2, the electrode terminal 320 is connectable to an external terminal (not shown) through an electrode lead wire 600. If the electrode terminal 320 is connected to the first electrode tap 215, the cap plate 310 is connected to the second electrode tap 225, so the electrode lead wire 600 connected to the electrode terminal 320 must be insulated from the cap plate 310. For this reason, the washer 500 is installed between the cap plate 310 and the electrode lead wire 600.

The washer 500 is made from an insulation material and has a centrally located electrode terminal hole 510 such that the electrode terminal 320 connected to the electrode lead wire 600 is exposable through the electrode terminal hole 510. A safety vent hole 520 is formed at one side of the washer 500 in order to expose the safety vent 317 and a plug hole 530 is formed at the other side of the washer 500 in order to allow the plug 315 inserted into the electrolyte injection hole 312 to protrude through the plug hole 530.

If debris is introduced into the recessed safety vent 317, the safety vent 317 may not fracture even if the internal pressure of the battery increases up to a dangerous pressure, thereby causing an explosion or burning of the battery. For this reason, a cover 521 made from a transparent material may be installed on the safety vent hole 520. In one exemplary embodiment, the cover 521 is made from a transparent insulation material selected from the group consisting of poly-butylene-terephthalate (PBT), polyethylene, PET, polypropylene, Teflon, and poly-tetra-fluoro-ethylene.

In addition, as shown in FIG. 2, the washer 500 has on a bottom surface at least two support members 540 so that the washer 500 is spaced from the upper surface of the cap plate 310 by means of the support plates 540. The height of the support member 540 may be designed such that an upper portion of the plug 315 sealing the electrolyte injection hole 312 does not protrude beyond the upper surface of the washer 500. In addition, the upper portion of the plug 315 may be coated with an insulation material so as to insulate the cap plate 310 from the washer 500. Additionally, an adhesive layer 541 may be formed at a lower surface of the support member 540 so as to fix the washer 500 to the cap plate 310.

Therefore, when the washer 500 is installed on the cap plate 310, not only is the cap plate 310 insulated from the electrode lead wire 600, but also the position of the safety vent 317 is exposed through the safety vent hole 520. In addition, the plug 315 inserted into the electrolyte injection hole 312 may protrude through the plug hole 530 of the washer 500.

As mentioned above, according to an embodiment of the present invention, the location of the safety vent is exposed to the exterior through the safety vent hole formed at one side of the washer. Thus, it is not necessary to disassemble the washer in order to check the location of the safety vent during the fabrication process for the secondary battery.

In addition, since the washer has a plug hole on one side, the plug inserted into the electrolyte injection hole may protrude through the plug hole so that the washer may be securely installed on the cap plate in the horizontal state without interference from the protrusion part of the plug. Thus, the secondary battery may be securely assembled.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    a can for receiving an electrolyte and an electrode assembly, the electrode assembly including a first electrode plate, a second electrode plate and a separator between the first electrode plate and the second electrode plate in a jelly roll configuration;
    a cap assembly including a cap plate covering an upper portion of the can and an electrode terminal connected to one of the first electrode plate and the second electrode plate within a center portion of the cap plate;
    an electrode lead wire connected to an upper surface of the electrode terminal to connect the electrode terminal to an external terminal; and
    a washer on an upper surface of the cap assembly to insulate the cap plate from the electrode lead wire, the washer including a hole through which the electrode terminal protrudes and an exposure part for exposing a portion of the cap plate.

2. The secondary battery as claimed in claim 1, wherein the cap plate has a safety vent on a first side; and
    the exposure part includes a safety vent hole aligned with the safety vent.

3. The secondary battery as claimed in claim 2, wherein a cover comprising transparent resin is the safety vent hole.

4. The secondary battery as claimed in claim 3, wherein the transparent resin is one selected from the group consisting of poly-butylene-terephthalate, polyethylene, polyethylene terepthalate, polypropylene, and poly-tetra-fluoro-ethylene.

5. The secondary battery as claimed in claim 2, wherein the cap plate has an electrolyte injection hole sealed by a plug, and the washer has a plug hole for allowing the plug to protrude through the plug hole.

6. The secondary battery as claimed in claim 5, wherein an insulation material is on an upper surface of the plug.

7. The secondary battery as claimed in claim 2, wherein at least two support members are on a bottom surface of the washer to space the cap plate from the bottom surface of the washer.

8. The secondary battery as claimed in claim 7, wherein a height of the at least two support members is such that an uppper portion of the plug does not protrude beyond an upper surface of the washer.

9. The secondary battery as claimed in claim 1, wherein the cap plate has an electrolyte injection hole sealed by a plug, and the exposure part includes a plug hole exposing the plug.

* * * * *

UNITED STATES PATENT AND TRADEMARK OFFICE
CERTIFICATE OF CORRECTION

PATENT NO. : 7,541,110 B2 Page 1 of 1
APPLICATION NO. : 11/234822
DATED : June 2, 2009
INVENTOR(S) : Byeong Deok Jeon It is certified that error appears in the above-identified patent and that said Letters Patent is hereby corrected as shown below:

Column 6, Claim 3, line 14     Insert the word -- in -- after the word "is"

Column 6, Claim 8, line 31     Delete "uppper" insert -- upper --

Signed and Sealed this

Twenty-ninth Day of June, 2010

David J. Kappos
*Director of the United States Patent and Trademark Office*